March 28, 1939.  T. B. TYLER  2,151,950
TRANSMISSION
Filed Jan. 24, 1936  3 Sheets-Sheet 2

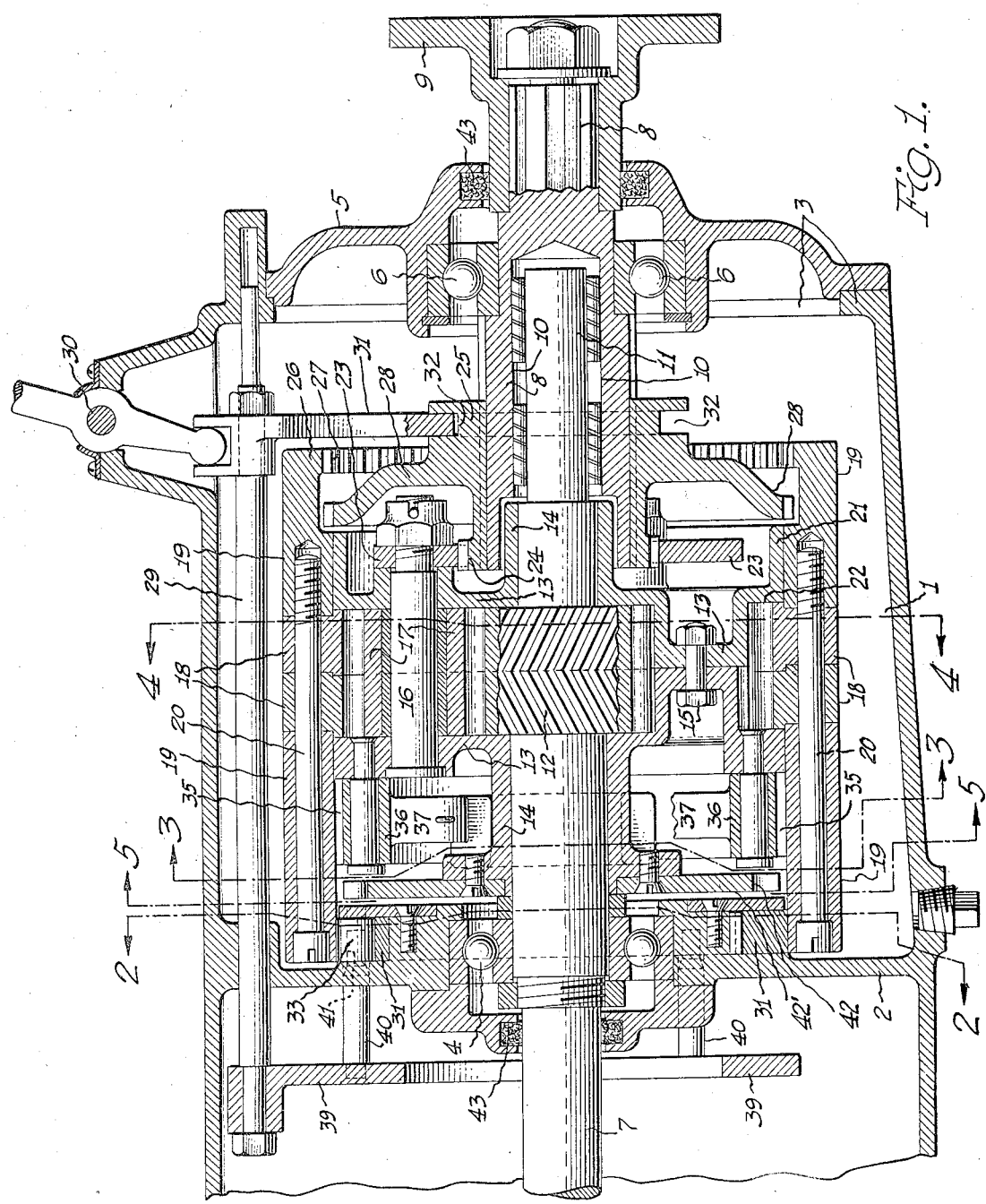

INVENTOR
Tracy Brooks Tyler,
BY
ATTORNEYS

March 28, 1939. T. B. TYLER 2,151,950
TRANSMISSION
Filed Jan. 24, 1936 3 Sheets-Sheet 3
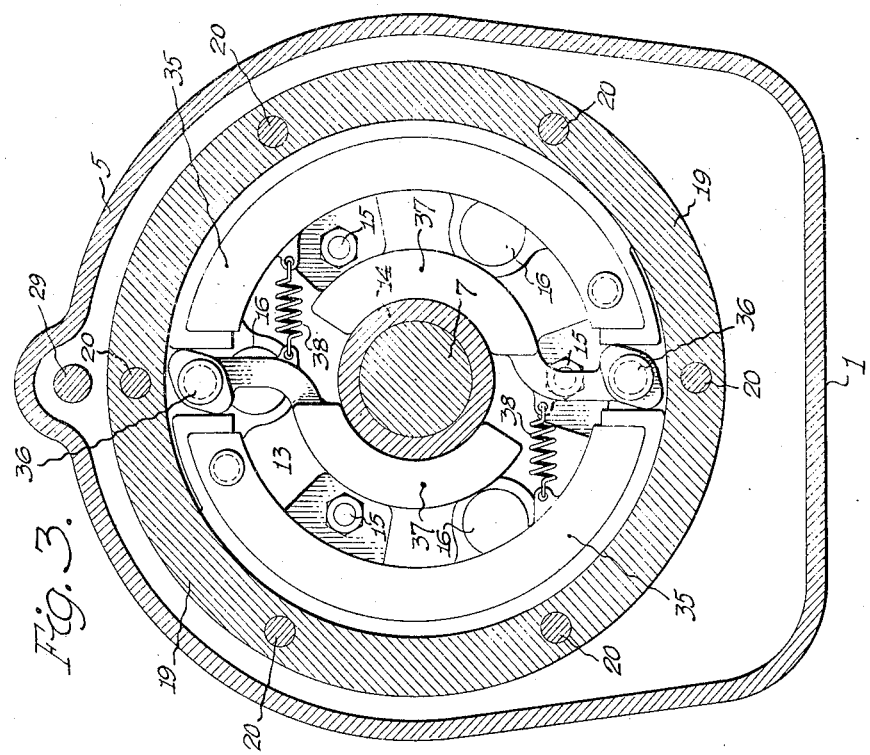
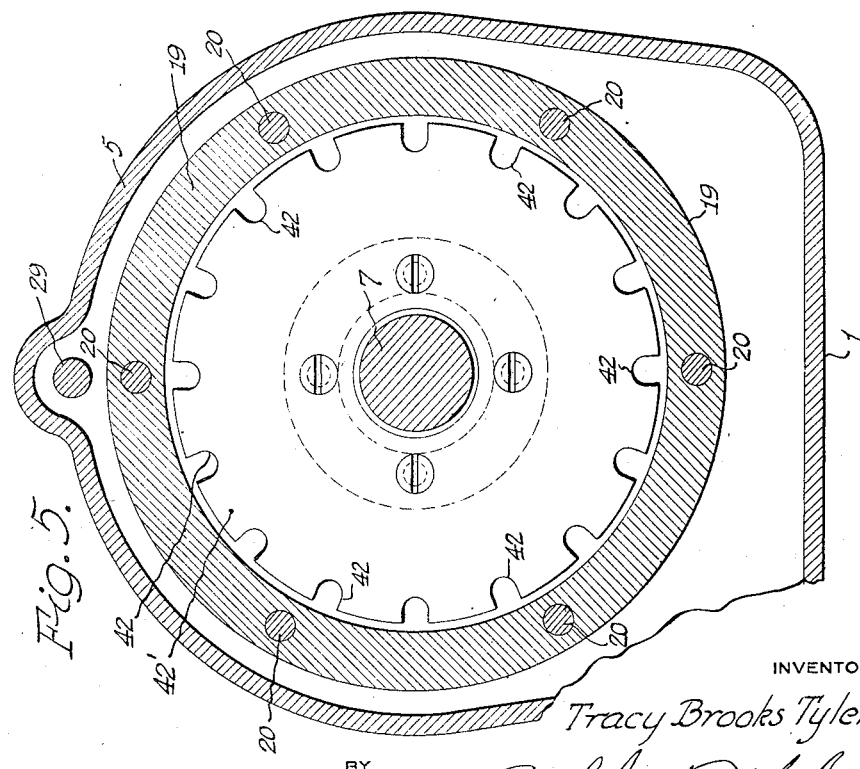
INVENTOR
Tracy Brooks Tyler,
BY
ATTORNEYS Patented Mar. 28, 1939

2,151,950

UNITED STATES PATENT OFFICE 2,151,950

TRANSMISSION

Tracy Brooks Tyler, Detroit, Mich., assignor to The Monopower Corporation, a corporation of Michigan Application January 24, 1936, Serial No. 60,571

1 Claim. (Cl. 74—260)

The present invention relates to a novel torque changing mechanism adapted for use in combination with automotive vehicles, manufacturing machines, and any other devices, mechanisms, or machines wherein it is essential to the operation thereof that the relative torque of a drive and driven member be varied.

The primary object of the present invention is to provide a change torque mechanism wherein the change from the high torque ratio to the lower torque ratio is gradual and accomplished while the drive member and driven member are rotated. In other words the present device avoids necessity of employing a master clutch for stopping rotation of the drive member while the change from one torque ratio to another is being made.

Another object of the present invention is to provide a change torque mechanism of a type particularly suitable for use in automotive vehicles for transmitting power from the engine or drive shaft to a propeller or driven shaft connected to the driving wheels so that constant acceleration from a standing start to the highest possible speed of the vehicle may be attained, this being possible due to the fact that it is not necessary to bring the drive shaft to a stop or to a low speed of rotation to permit the torque change mechanism to vary the torque ratio from a high ratio to a low ratio.

Still another object of the present invention is to provide a change torque mechanism for use in combination with various types of driving and driven mechanisms wherein it is desirable to provide variable torque drives and a reverse drive between the driving and driven mechanisms.

The invention essentially embodies a planetary train of gears, mounted within an internally toothed drum that, under normal forward drive conditions, cannot rotate in a reverse direction due to the forces set up by rotation of the planetary train of gears with which it is in constant mesh. The planetary train of gears is driven by the drive shaft and is supported in a freely rotatable spider that may be connected by a positive clutch to a member to be driven, the clutch being controlled by any suitable automatic or manual means. In combination with the planetary train of gears the invention provides a centrifugally operable clutch, responsive to the rotative speed of the gear supporting spider to engage the drum within which said gears are mounted, engagement of the clutch gradually relieving the planetary train of the driving load until a predetermined speed is attained, at which time the planetary train is entirely eliminated as active elements in the drive and a direct drive established between the driving and driven elements. Likewise the clutch may be gradually eliminated by the planetary train of gears taking the driving load upon deceleration.

With the above and other ends in view the invention consists in matters hereinafter set forth and more particularly pointed out in the appended claim, reference being had to the accompanying drawings in which Figure 1 is a longitudinal cross section of a change torque mechanism embodying the present invention;

Fig. 3 is a transverse cross section taken on line 3—3 of Fig. 1;

Fig. 5 is a section taken on line 5—5 of Fig. 1.

Like characters of reference are employed throughout to designate corresponding parts.

Figure 4:
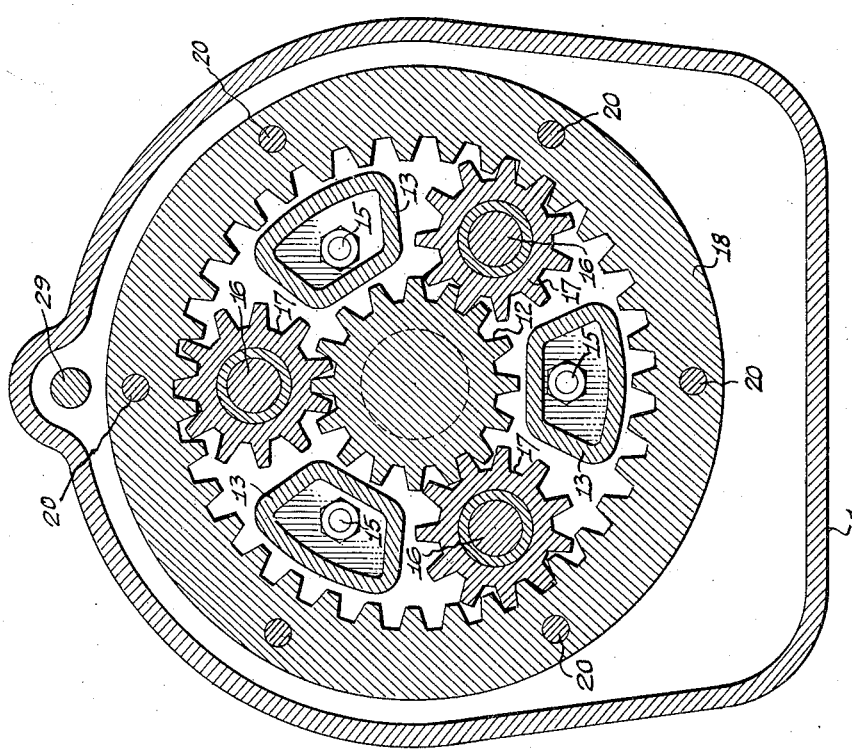
Fig. 4 is a transverse cross section taken on the line 4—4 of Fig. 1.
Figure 2:
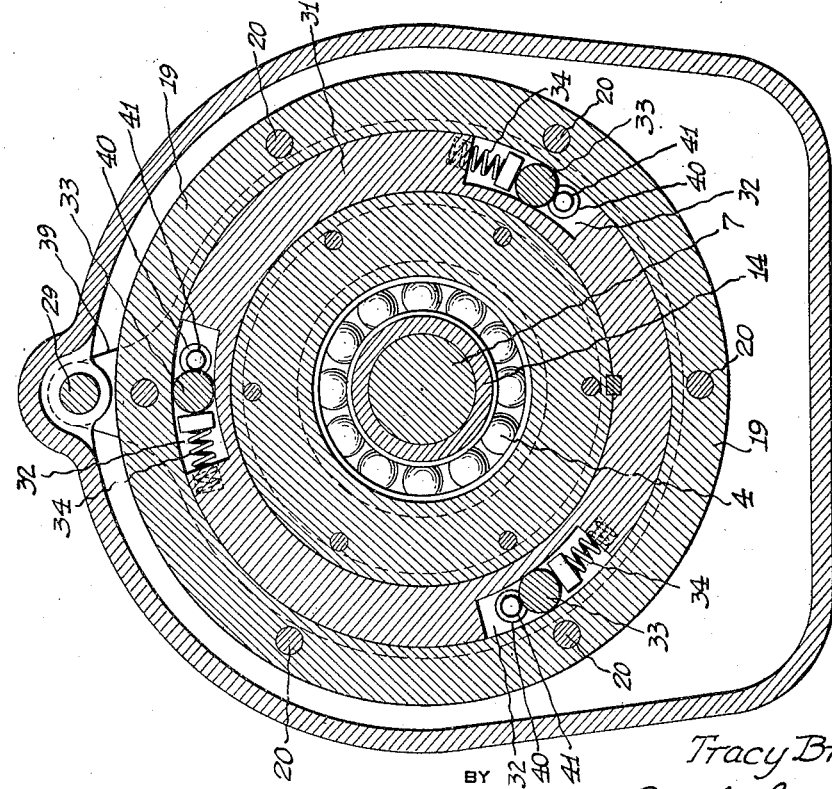
Fig. 2 is a transverse cross section taken on line 2—2 of Fig. 1.

In Fig. 1 of the drawings there is illustrated a casing 1 formed with end walls 2 and 3, each of said walls being formed with an opening therein. The opening in the wall 2 receives bearings and race 4 and the opening in the wall 3 is provided with a removable cover plate 5 in which is mounted bearings and race 6. A shaft 7 extends into the casing 1 and is supported in the bearings 4, and it is to be understood that the shaft 7 is connected to any suitable driving means, to be rotated thereby, and that it will be hereinafter known as the drive shaft or drive member.

Extending into the casing 1 from the opposite end and supported in the bearings 6 is a shaft 8, the latter shaft being provided with means 9 through which it may be connected to any machine element to drive the same when a driving connection is established in a manner and through mechanism to be presently described. For descriptive purposes and in the claims the shaft 8 will hereinafter be termed the driven shaft or the driven member.

That end of the driven member 8 which projects into the casing is provided with a concentric bore 10, and the end of the drive member 7 that projects into the casing is provided with a concentric pilot portion 11. The pilot portion 11 is received in the bore 10 and thus maintains the driving and driven members in axial alignment.

On the driven member 7 is secured or formed integral therewith, a herring bone gear 12. A pair of coinciding spider plates 13 are provided with hub portions 14 that are received on the driven member, one of said spider plates being located on each side of the herring bone gear 12. The two spider plates are bolted together as at 15 and are free to rotate relative to the drive member and the herring bone gear thereon.

Mounted in the spider plates 13 are a plurality of planet gear shafts 16 on which are mounted herring bone gears 17, the latter being free to rotate on said shafts and held in constant mesh with the gear 12 thereby. A two-part ring gear 18 is supported in mesh with the gears 17 by a sectional drum 19. The sections of the drum 19 are secured together by bolts 20 and the drum is supported concentric with the axis of the drive member 7 by flanges 21 on the outer edges of the spider plates 13. In order to prevent the drum 19 from moving longitudinally the plates 13 are provided with shoulders 22 that engage the sides of the ring gears 18.

Secured on one of the spider plates 13 is an internally toothed clutch ring 23 that co-acts with a toothed flange 24 on a sliding clutch element 25, the latter being keyed to the driven member to rotate therewith. The end of the drum 19 adjacent the end 3 of the casing is provided with an inwardly extending flange 26 that is internally toothed as at 27. A clutch member 28 is mounted or formed on the sliding clutch element 25 to co-act with the clutch teeth 27 in creating a driving connection between the drum 19 and clutch element 25, and ultimately to the driven member 11.

In a manner presently to be described the clutch parts 23 and 24 serve as a forward drive mechanism, and the clutch parts 27 and 28 serve as a reverse drive clutch, when said respective parts are in mesh. With this understood, the shifter mechanism for the clutch will be described, the mechanism includes a slidable bar 29 that may be moved longitudinally by a rocking lever 30. The bar 29 carries a yoke 31 that is received in a groove 32 in the slidable clutch element. It is obvious from the illustration that the lever 30 may be rocked to move the sliding clutch element 25 so that clutch parts 23 and 24 are engaged to establish a forward drive at which time clutch parts 27 and 28 are disengaged. The lever 30 may be moved to disengage clutch parts 23 and 24 and engage clutch parts 27 and 28, or it may be moved to disengage both sets of clutch parts.

On the inner face of the end wall 2 is formed a concentric boss 31 having a plurality of grooves 32 of varying depth, the grooves being formed to correspond one with the other, and to receive rollers 33. The end of the drum 19 extends over the boss 31 and the rollers are urgged by springs 34 to the shallow part of the grooves 32. It is obvious that the bottoms of the grooves act as cam or wedge surfaces so that rotation of the drum 19 in one direction resulting from external pressure thereon, causes the rollers 33 to become wedged between the drum and bottom of their respective grooves and thus lock the drum against rotation in that direction. Pressure tending to rotate the drum in the opposite direction, however, causes the drum 19 to brush the rollers to a lower part of the groove bottoms so that they permit rotation of the drum in that direction.

Pivotally mounted on one of the spider plates 13 are a pair of clutch shoes 35 that are adapted to be expanded into contact with the drum 19 by cams 36. The cams 36 are actuated by weighted arms 37 that are normally held by springs 38 to hold the cams 36 and shoes 35 inactive. It is obvious however, that upon rotation of the spider plate centrifugal force is set up to move said arms outwardly to actuate cams 36 to force shoes 35 into contact with the drum 19.

For the purpose of obtaining the reverse drive there is provided a downwardly projecting arm 39 on the sliding bar 29, the arm having an opening through which the driving member 7 projects. A number of pins 40 are carried by the arm 39 and one of said pins projects into each of the grooves 32, adjacent the rollers 33 therein. The pins are formed with two diameters, the smaller diameter being disposed in the groove adjacent the roller when clutch parts 23 and 24 are engaged so that the roller may move a sufficient distance in the groove to povide the wedging action above described that prevents rotation of the drum 19 in one direction. When the large diameter of the pins extend into the grooves the rollers 33 are held out of a wedging position and the drum 19 is therefore free to rotate in either direction. The larger part of the pins engages the rollers 33 when the clutch parts 27 and 28 are engaged.

Notches 42 are provided to receive the ends 41 of the pins 40 when the larger diameter of the latter prevents the wedging action of the rollers, these notches being formed in any part of the mechanism that is connected to the spider 13, and as illustrated in a plate 42' that is secured to the hub 14 of the spider 13.

The operation will be described with reference to Fig. 1 wherein the parts are shown in forward drive position, inasmuch as clutch elements 23 and 24 are engaged. It will be assumed that the driving member 7 is rotated by any suitable power means to rotate the gear 12, the gear 12 being the sun gear in the planetary arrangement shown. The planet gears 17 are in constant mesh with gear 12 and are rotated thereby, the tendency of this rotative pressure on gears 17 obviously being to rotate the drum 19 in the direction opposite to the rotation of gear 12. At this time the pins 40 are in a position so that the rollers 33 are permitted to become wedged between the stationary boss 31 and the drum 19 to prevent rotation of the latter and thus cause the gears 12 and 17 to rotate in planetary fashion accompanied by rotation of the spider 13. As above stated parts 23 and 24 are engaged and upon rotation of the spider the clutch element 25 is driven thereby and rotation of the driven member 11 caused. The above described drive is the high torque drive.

As the rotative speed of the spider 13 is increased by increasing the speed of the drive member the centrifugal force urging the weighted arms 37 outwardly also increases correspondingly. When sufficient centrifugal pressure is built up the arms 37 rotate cams 36 and force the clutch shoes 35 into contact with the drum 19 and thus gradually establish a driving connection between the spider 13 and the drum 19 and by so doing the effectiveness of the speed reducing planetary gear train as a driving connection is eliminated and the driven member is rotated at the same speed as the drive member and with correspondingly increased speed and lowered torque.

To attain the reverse drive the shifter bar 29 is moved so that clutch parts 27 and 28 are engaged, at which time the rollers 33 are held out of their wedging position by pins 40 and the spider 13 is held against rotation by the ends 41 of the pins engaging in the slots 42 to prevent planetary action of the gears. Upon rotation of the gear 12 the gears 17 are rotated and serve as common idler gears to cause rotation of the drum 18 in a direction opposite to the rotation of gear 12, the rotary motion of the drum being transmitted through clutch parts 27, 28 and 25 to the driven member 11 which accordingly rotates in the opposite direction as compared with the drive member.

Seals 43 are provided at each end of the casing to retain liquid lubricant therein, so that the entire mechanism above described may be operated while submerged in oil.

Although a specific embodiment of the present invention has been illustrated and described it is to be understood that various changes may be made in the details of construction without departing from the spirit of the invention as set forth in the appended claim, and such changes are contemplated.

What I claim is:

In a transmission having a rotatable drum and a rotatable element therein, a stationary element adjacent said drum, a brake between said drum and stationary element, said brake comprising a series of rollers contacting a surface of said drum and inclined surfaces on said stationary element whereby they normally prevent rotation of the drum in one direction, and means for moving said rollers to a position wherein they are inoperative to prevent rotation of the drum, said last named means having extended portions adapted to engage said rotatable element when said rollers are rendered inoperative.

TRACY BROOKS TYLER.